United States Patent
Borzabadi et al.

(10) Patent No.: US 7,117,747 B2
(45) Date of Patent: Oct. 10, 2006

(54) INTEGRATED PRESSURE SENSOR AND METHOD OF MANUFACTURE

(75) Inventors: Hamid R. Borzabadi, Noblesville, IN (US); Dennis M. Koglin, Carmel, IN (US); Stephen P. Long, Tipton, IN (US); Timothy A. Vas, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/028,343

(22) Filed: Jan. 3, 2005

(65) Prior Publication Data

US 2006/0144156 A1 Jul. 6, 2006

(51) Int. Cl.
*G01L 9/00* (2006.01)

(52) U.S. Cl. .......................... 73/754; 73/753
(58) Field of Classification Search ............... 73/754, 73/753
See application file for complete search history.

(56) References Cited

U.S. PATENT DOCUMENTS

| | | | |
|---|---|---|---|
| 3,886,799 A | 6/1975 | Bilette et al. | |
| 4,390,028 A | 6/1983 | Okano et al. | |
| 4,404,539 A | 9/1983 | Yamada et al. | |
| 4,556,807 A | 12/1985 | Yamada et al. | |
| 4,986,131 A | 1/1991 | Sugiyama et al. | |
| 5,062,302 A * | 11/1991 | Petersen et al. | 73/754 |
| 5,407,730 A * | 4/1995 | Imanaka | 428/209 |
| 5,431,057 A | 7/1995 | Zimmer et al. | |
| 5,581,038 A | 12/1996 | Lampropoulos et al. | |
| 5,700,981 A * | 12/1997 | Tuttle et al. | 174/250 |
| 5,719,069 A * | 2/1998 | Sparks | 438/50 |
| 5,981,314 A * | 11/1999 | Glenn et al. | 438/127 |
| 6,192,761 B1 * | 2/2001 | Sekimori et al. | 73/754 |
| 6,229,404 B1 * | 5/2001 | Hatanaka | 331/68 |
| 6,833,645 B1 * | 12/2004 | Koeneman | 310/100 |
| 2001/0049965 A1 * | 12/2001 | Groger | 73/753 |
| 2003/0217603 A1 * | 11/2003 | Ishio | 73/754 |
| 2003/0227094 A1 * | 12/2003 | Chou et al. | 257/778 |
| 2004/0079159 A1 | 4/2004 | Muchow | |
| 2004/0103724 A1 * | 6/2004 | Takizawa et al. | 73/754 |
| 2005/0146004 A1 * | 7/2005 | Seto | 257/678 |
| 2005/0161753 A1 * | 7/2005 | Huff et al. | 257/431 |

FOREIGN PATENT DOCUMENTS

| | | |
|---|---|---|
| EP | 0677725 | 10/1995 |
| EP | 0964252 | 12/1999 |

(Continued)

*Primary Examiner*—Edward Lefkowitz
*Assistant Examiner*—George P Bonanto
(74) *Attorney, Agent, or Firm*—Jimmy L. Funke

(57) ABSTRACT

A technique for manufacturing an integrated pressure sensor includes a number of steps. Initially, a substrate with conductive electrical traces located on first and second sides of the substrate is provided. A plurality of compensation circuits are positioned in an array on the first side of the substrate in electrical contact with one or more of the conductive electrical traces on the first side of the substrate. A plurality of pressure sensors are positioned on the second side of the substrate in electrical contact with one or more of the conductive electrical traces on the second side of the substrate. Each one of the sensors is associated with one of the compensation circuits to form a plurality of pressure sensor-compensation circuit pairs. The substrate includes conductive vias to electrically connect each of the sensor-compensation circuit pairs. Each of the compensation circuits provides temperature compensation for an associated one of the sensors. The sensor-compensation circuit pairs are calibrated and singulated for final packaging.

18 Claims, 4 Drawing Sheets

FOREIGN PATENT DOCUMENTS

| | | | | | |
|---|---|---|---|---|---|
| EP | 1300664 | 4/2003 | JP | 01199476 | 8/1989 |

* cited by examiner

INTEGRATED PRESSURE SENSOR AND METHOD OF MANUFACTURE

TECHNICAL FIELD

The present invention is generally directed to a pressure sensor and, more specifically, to an integrated pressure sensor.

BACKGROUND OF THE INVENTION

Today, pressure sensors are widely utilized in motor vehicles to control and/or monitor vehicle operation. In general, a pressure sensor provides a relatively accurate analog voltage at its output that is representative of a sensed input pressure. When implemented within a motor vehicle, a pressure sensor may experience temperatures ranging between −40 degrees C. to +125 degrees C. In order to provide useful information, the accuracy of an automotive pressure sensor must be maintained over the above-referenced temperature range for the life of an associated motor vehicle.

Typically, commercially available pressure sensors have been calibrated after incorporation within a final pressure sensor assembly, which has typically included a pressure sensor, a compensation circuit and other associated circuitry. In general, such final pressure sensor assemblies have been relatively large, e.g., at least two inches by one inch. Due to the relatively large size of the assemblies, processing a relatively large number of the assemblies simultaneously has been cost prohibitive.

What is needed is a technique for producing a relatively low-cost pressure sensor for motor vehicle applications. It would also be desirable for a pressure sensor to be designed so as to be readily producible in a high-volume production environment.

SUMMARY OF THE INVENTION

The present invention is generally directed to a technique for manufacturing an integrated pressure sensor. According to the present invention, a substrate with conductive electrical traces located on first and second sides is provided. A plurality of compensation circuits, which are positioned in an array on the first side of the substrate, are positioned in electrical contact with one or more of the conductive electrical traces on the first side of the substrate. A plurality of pressure sensors are positioned on the second side of the substrate in electrical contact with one or more of the conductive electrical traces on the second side of the substrate. Each one of the sensors is associated with one of the compensation circuits, which is configured to provide temperature compensation for an associated one of the sensors, to form a plurality of pressure sensor-compensation circuit pairs. The substrate also includes conductive vias to electrically connect each of the sensor-compensation circuit pairs. According to the present invention, each of the sensor-compensation circuit pairs is calibrated and singulated for final packaging.

According to one embodiment of the present invention, the substrate is a low-temperature co-fired ceramic (LTCC). According to another aspect of the present invention, the compensation circuits each include an application specific integrated circuit (ASIC). According to this aspect of the invention, the ASIC is configured to provide temperature and long-term drift compensation of an associated one of the sensors. According to a different aspect of the invention, the array is a 9 by 10 array. According to yet another embodiment of the present invention, the sensor-compensation circuit pairs are calibrated in parallel before singulation.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
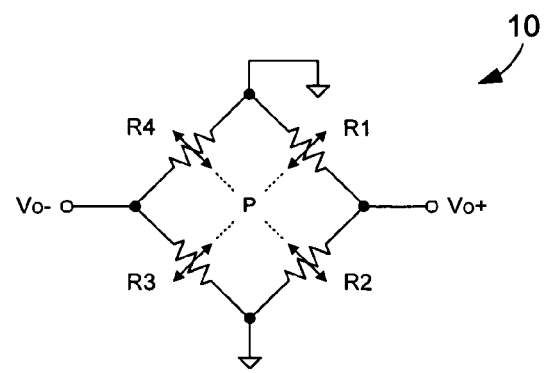
FIG. 1 is an electrical diagram of a typical pressure sensor.

Referring to FIG. 1, an exemplary pressure sensor 10 is depicted that includes a plurality of resistors R1–R4, which are connected in a Wheatstone bridge configuration. The resistance of the resistors R1 and R3 decrease in magnitude proportional to an applied pressure and the resistance of the resistors R2 and R4 increase in magnitude proportional to an applied pressure. These resistive changes cause a voltage $V_O+$ to increase and the voltage $V_O-$ to decrease at the output of the sensor 10, producing a differential output voltage that is proportional to an applied pressure.

Figure 2:
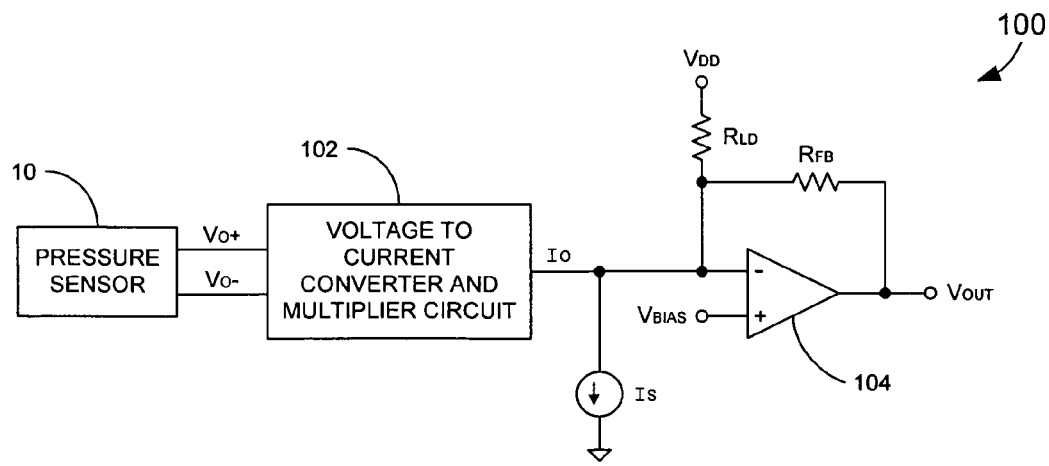
FIG. 2 is an electrical diagram in block and schematic form of a pressure sensor coupled to a compensation circuit.

With reference to FIG. 2, the pressure sensor 10 is shown coupled to a compensation circuit 100. The compensation circuit 100 includes a voltage to current converter and multiplier circuit 102, whose input is coupled to the pressure sensor 10 and whose output is coupled to an inverting input of an operational amplifier 104. As is shown, a current source $I_s$ is also coupled to the inverting input of the operational amplifier 104. The circuit 102 includes a multiplier that compensates for gain at room temperature and temperature-dependent gain.

The current source $I_s$ compensates for sensor offsets at room temperature and temperature-dependent sensor offsets. The current $I_O$ and $I_s$ are converted to an output voltage VOUT, which is provided at an output of the amplifier 104. As is shown, a feedback resistor RFB is coupled between the output of the amplifier 104 and the inverting input of the amplifier 104. A load resister RLD is coupled between power supply VDD and the non-inverting input of the amplifier 104. A bias voltage (VBIAS) is applied to the non-inverting input of the amplifier 104. The resistor RLD provides a current that places the output voltage VOUT of the amplifier 104 at a desired DC voltage offset. The output voltage VOUT ranges in value between ground and the supply voltage VDD. The output voltage VOUT is proportional to the pressure applied to the sensor. Implementing the circuit 100 allows for linear errors in gain, offset and temperature dependencies to be compensated.

According to the present invention, a relatively low-cost technique for assembling pressure sensors for motor vehicle applications is described herein. The technique allows for integrated pressure sensors to be produced in a high-volume production environment, as it allows for multiple integrated pressure sensors to be calibrated in parallel in a relatively short period of time.

Figure 3A:
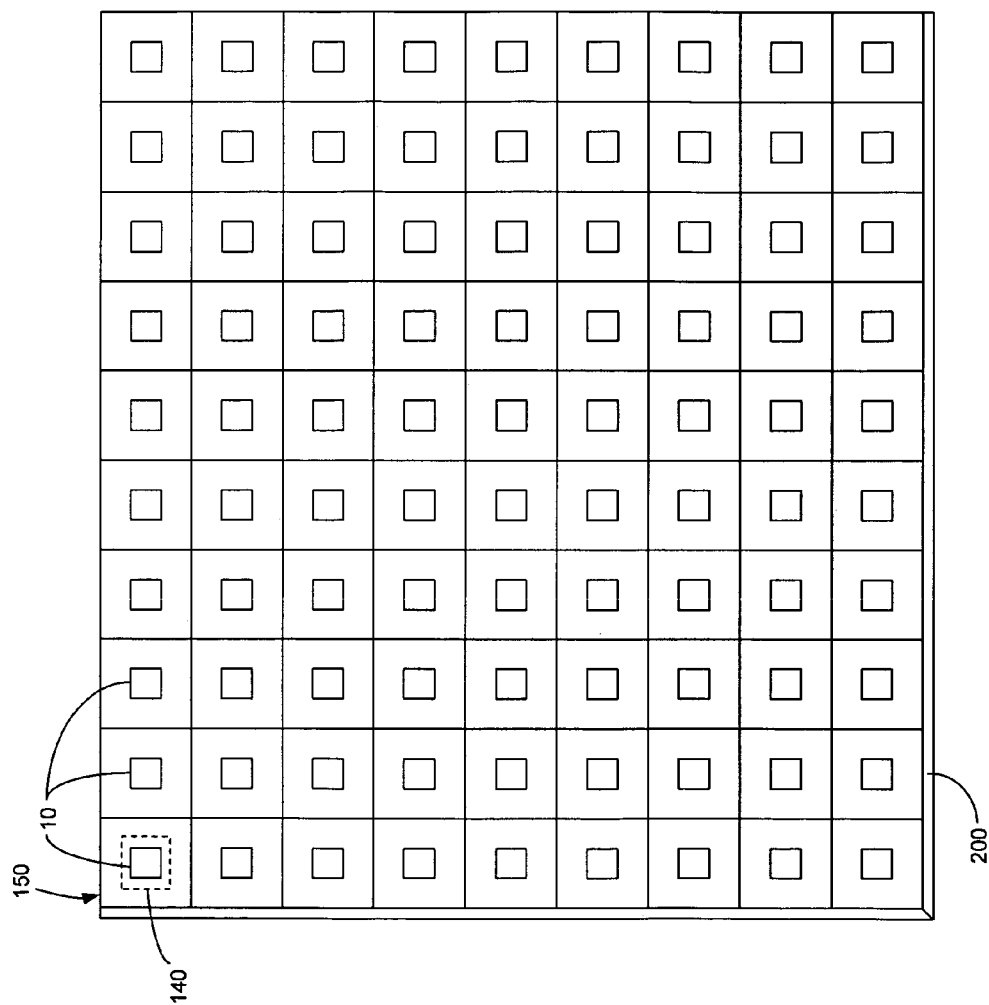
FIGS. 3A–3B are perspective views of a front and rear of an exemplary substrate, including a plurality of pressure sensors and compensation circuits, respectively, constructed according to the present invention.
Figure 3B:
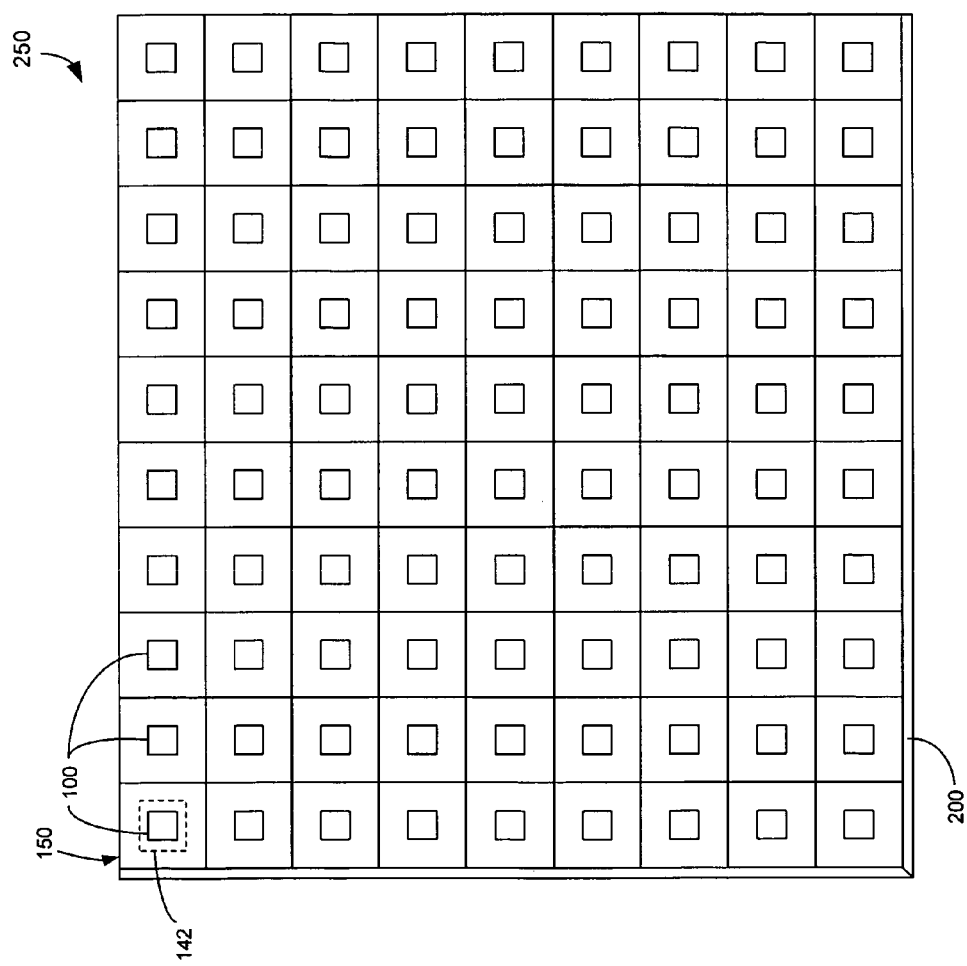

FIG. 3A depicts a substrate 200 with a plurality of pressure sensors 10 distributed in an array across the face of the substrate 200. FIG. 3B depicts a second side of the substrate 200 with a plurality of compensation circuits 100 positioned in an array on the substrate 200. The substrate 200 may be, for example, a low-temperature co-fired ceramic (LTCC), or may take other forms, such as a printed circuit board (PCB). The compensation circuit 100 may be implemented in an application specific integrated circuit (ASIC) or separate analog circuitry. As previously mentioned, the compensation circuit 100 is located on one side of the substrate 200 and the pressure sensor 10 is located on the opposite side of the substrate 200 to reduce the footprint of the integrated pressure sensor. As is shown for one compensation circuit-pressure sensor pair 150, an electromagnetic shield 140, e.g., a metal can, may be implemented for each sensor 10 (to shield the sensor 10 from electromagnetic interference (EMI) and protect the sensor 10 from damage during processing) and an electromagnetic shield 142 may be implemented for each of the compensation circuits 100 (to shield the compensation circuits 100 from EMI and protect the compensation circuits 100 from damage during processing).

Utilizing the manufacturing process described herein allows for a relatively small pressure sensor to be manufactured, e.g., a pressure sensor having a size of 0.3 inch by 0.27 inch. Further, providing the components in an array allows for a number of devices to be processed concurrently. For example, providing compensation circuits and pressure sensors in a 9 by 10 array allows for 90 devices to be concurrently processed. Further, providing the pressure sensors in an array allows for the sensors to be calibrated in parallel. In general, the number of units that can be processed in parallel is determined by the tester capacity, rather than the final assembly size of the pressure sensor. Thus, the manufacturing process can be optimized for a given tester. After calibration, each of the sensor-compensation circuit pairs is singulated for final packaging. The final package can vary in dimension, depending upon a customer's requirements and, thus, the same substrate can be utilized for multiple customers and different packaging requirements.

Figure 4:
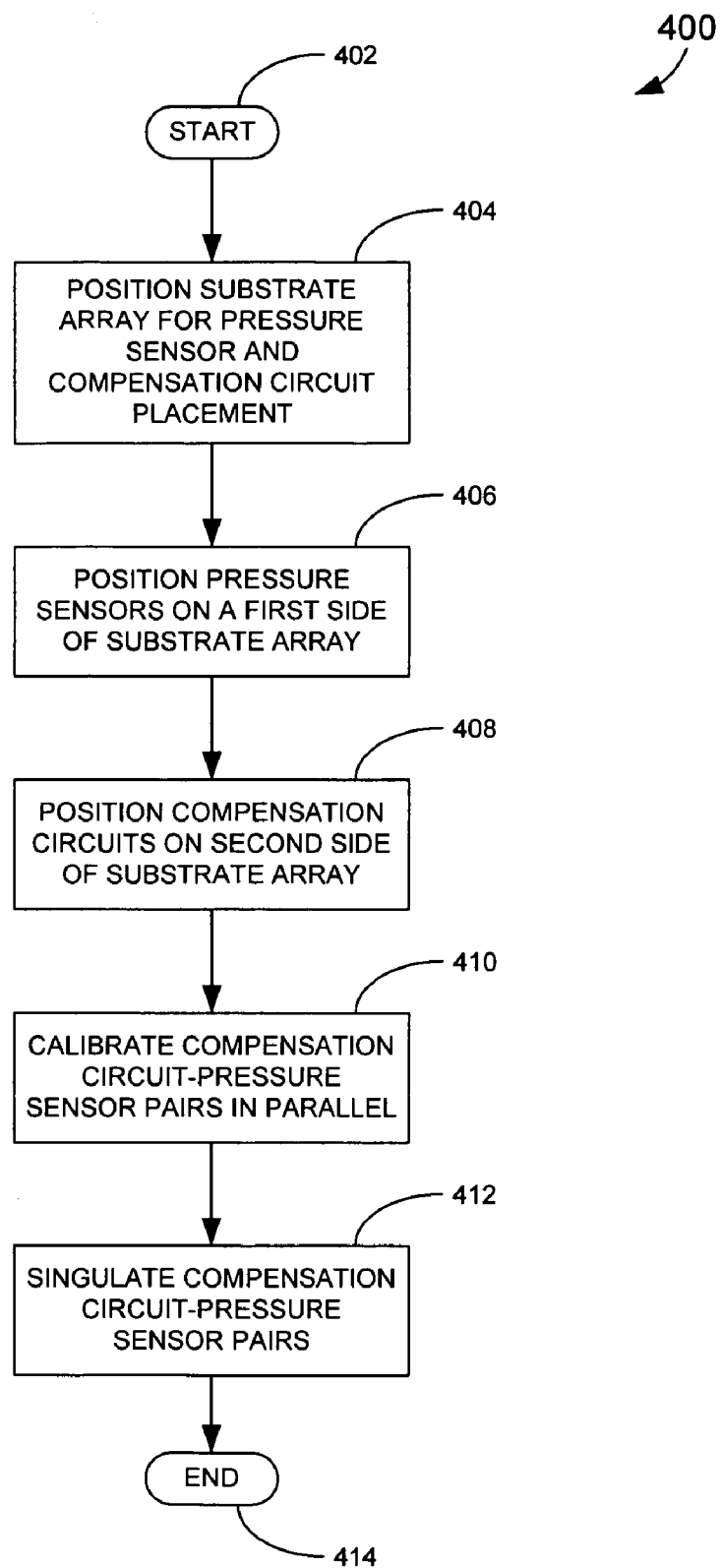
FIG. 4 is a flow chart of a process for manufacturing an integrated pressure sensor, according to the present invention.

FIG. 4 depicts a process 400 for manufacturing an integrated pressure sensor 150, according to the present invention. In step 402, a process 400 is initiated, at which point process step 404 is implemented, where a substrate 200 is positioned to receive a plurality of pressure sensors 10 and compensation circuits 100. Next, in step 406, a plurality of the pressure sensors 10 are positioned on a first side of the substrate 200 in an array. Next, in step 408, a plurality of the compensation circuits 100 are positioned on a second side of the substrate 100 in an array. It should be appreciated that the circuits 100 and the sensors 10 are electrically coupled to conductive electrical traces of the substrate 100 through a conventional process, e.g., a wave solder process. Then, in step 410, compensation circuit-pressure sensor pairs 150 are calibrated in parallel. Next, in step 412, the compensation circuit-pressure sensor pairs 150 are singulated to produce individual sensors for final packaging, at which point the process 400 terminates in step 414, where the individual integrated pressure sensors 150 are ready for final packaging.

Accordingly, a design and manufacturing process have been disclosed herein that allow for micro-package assembly and calibration in plate form. As the final design is relatively small and built in an array, calibration may be performed on multiple units in parallel. Further, the final assembly is independent of the substrate design and calibration process, which allows for a flexible low-cost manufacturing flow. The final product is a low-cost integrated pressure sensor that meets ever-increasing customer requirements.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A method for manufacturing an integrated pressure sensor, comprising the steps of:
 providing a substrate with a first side and a second side, wherein the substrate includes conductive electrical traces located on the first and second sides;
 positioning a plurality of compensation circuits on the first side of the substrate in electrical contact with one or more of the conductive electrical traces on the first side of the substrate, wherein the compensation circuits are positioned in an array;
 positioning a plurality of pressure sensors on the second side of the substrate in electrical contact with one or more of the conductive electrical traces on the second side of the substrate, wherein each one of the sensors is associated with one of the compensation circuits to form a plurality of pressure sensor-compensation circuit pairs, and wherein the substrate includes conductive vias to electrically connect each of the sensor-compensation circuit pairs, where each of the compensation circuits provides temperature compensation for an associated one of the sensors;
 calibrating each of the sensor-compensation circuit pairs; and
 singulating each of the sensor-compensation circuit pairs for final packaging.

2. The method of claim 1, wherein the substrate is a low-temperature co-fired ceramic (LTCC).

3. The method of claim 1, wherein the compensation circuits each include an application specific integrated circuit (ASIC).

4. The method of claim 3, wherein the ASIC is configured to provide temperature and long-term drift compensation for an associated one of the sensors.

5. The method of claim 1, wherein the array is a 9 by 10 array.

6. The method of claim 1, wherein the sensor-compensation circuit pairs are calibrated in parallel.

7. A method for manufacturing an integrated pressure sensor, comprising the steps of:
 providing a substrate with a first side and a second side, wherein the substrate includes conductive electrical traces located on the first and second sides;
 positioning a plurality of compensation circuits on the first side of the substrate in electrical contact with one or more of the conductive electrical traces on the first side of the substrate, wherein the compensation circuits are positioned in an array;

positioning a plurality of pressure sensors on the second side of the substrate in electrical contact with or more of the conductive electrical traces on the second side of the substrate, wherein each one of the sensors is associated with one of the compensation circuits to form a plurality of pressure sensor-compensation circuit pairs, and wherein the substrate includes conductive vias to electrically connect each of the sensor-compensation circuit pairs, where each of the compensation circuits provides temperature compensation for an associated one of the sensors;

calibrating each of the sensor-compensation circuit pairs, wherein the sensor-compensation circuit pairs are calibrated in parallel; and singulating each of the sensor-compensation circuit pairs for final packaging.

8. The method of claim 7, wherein the substrate is a low-temperature co-fired ceramic (LTCC).

9. he method of claim 7, wherein the substrate is a printed circuit board (PCB).

10. The method of claim 7, wherein the compensation circuits each include an application specific integrated circuit (ASIC).

11. The method of claim 10, wherein the ASIC is configured to provide temperature and long-term drift compensation for an associated one of the sensors.

12. The method of claim 7, wherein the array is a 9 by 10 array.

13. An integrated pressure sensor assembly, comprising:
a substrate with a first side and a second side, wherein the substrate includes conductive electrical traces located on the first and second sides;
a plurality of compensation circuits positioned on the first side of the substrate in electrical contact with one or more of the conductive electrical traces on the first side of the substrate, wherein the compensation circuits are positioned in an array; and
a plurality of pressure sensors positioned on the second side of the substrate in electrical contact with one or more of the conductive electrical traces on the second side of the substrate, wherein each one of the sensors is associated with one of the compensation circuits to form a plurality of pressure sensor-compensation circuit pairs, and wherein the substrate includes conductive vias to electrically connect the sensor-compensation circuit pairs, where each of the compensation circuits provides temperature compensation for an associated one of the sensors, and where each of the sensor-compensation circuit pairs are calibrated in parallel before being singulated for final packaging.

14. The integrated pressure sensor assembly of claim 13, wherein the substrate is a low-temperature co-fired ceramic (LTCC).

15. The integrated pressure sensor assembly of claim 13, wherein the substrate is a printed circuit board (PCB).

16. The integrated pressure sensor assembly of claim 13, wherein the compensation circuits each include an application specific integrated circuit (ASIC).

17. The integrated pressure sensor assembly of claim 16, wherein the ASIC is configured to provide temperature and long-term drift compensation for an associated one of the sensors.

18. The integrated pressure sensor assembly of claim 13, wherein the array is a 9 by 10 array.

* * * * *